Figures 1, 2:
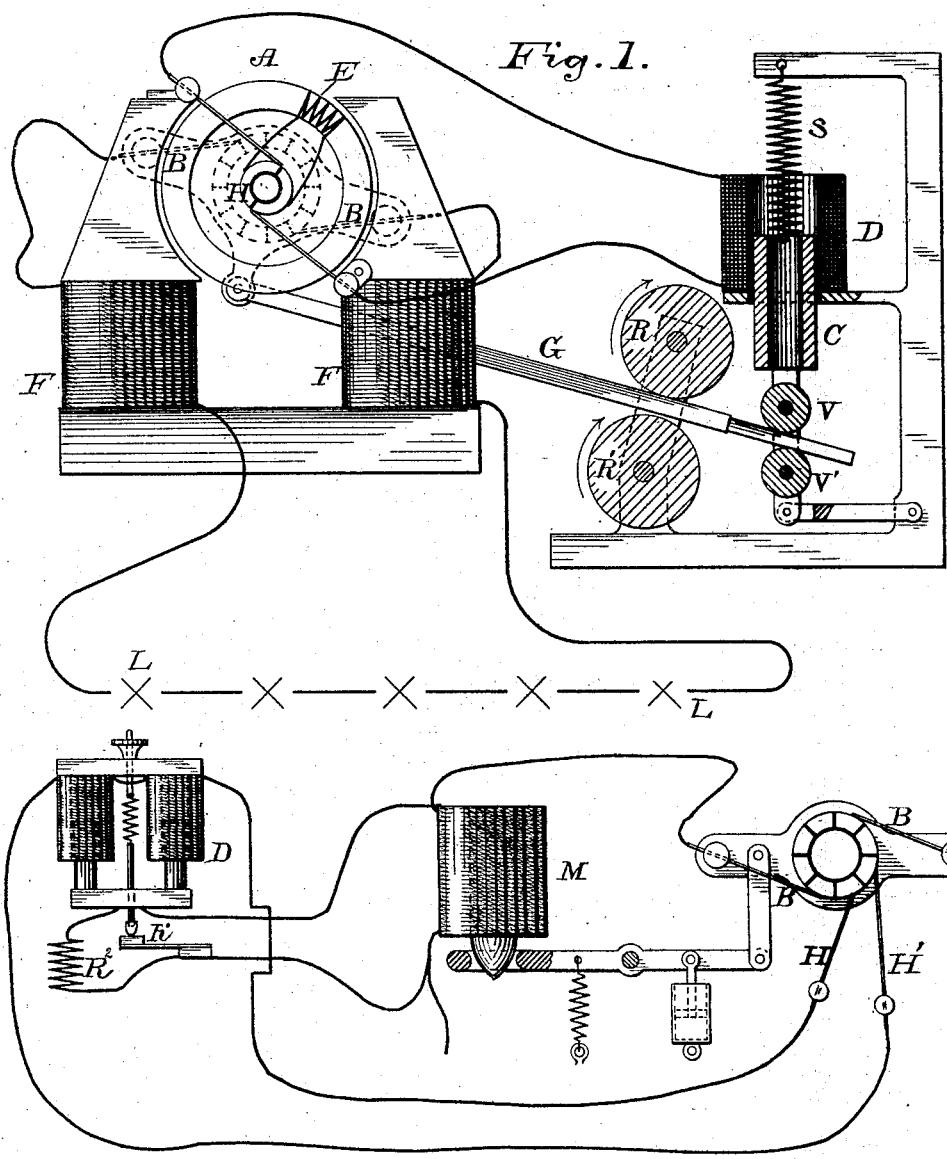

(No Model.) 3 Sheets—Sheet 1.

E. THOMSON.
REGULATOR FOR DYNAMO ELECTRIC MACHINES.

No. 485,239. Patented Nov. 1, 1892.

WITNESSES:
Ira R. Steward
Wm. H. Capel

INVENTOR
ELIHU THOMSON.
BY
Townsend MacArthur
ATTORNEYS (No Model.) 3 Sheets—Sheet 2.
E. THOMSON.
REGULATOR FOR DYNAMO ELECTRIC MACHINES.
No. 485,239. Patented Nov. 1, 1892.
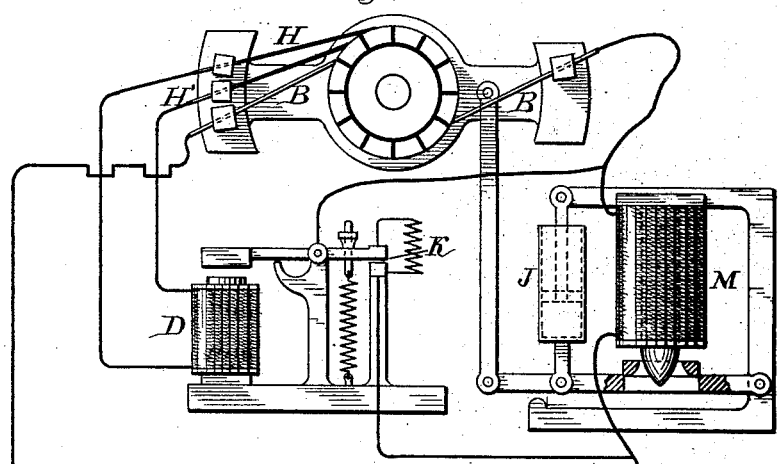
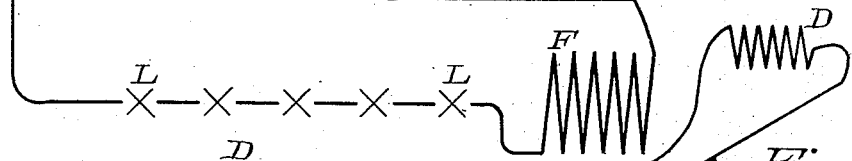
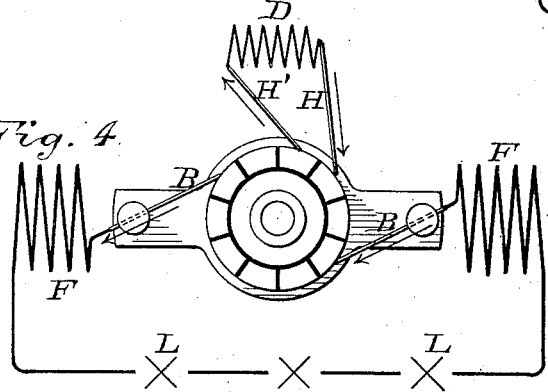
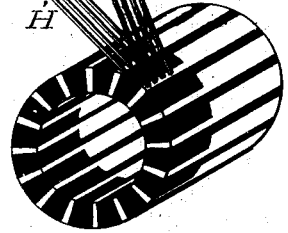
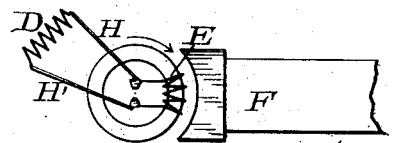
WITNESSES:
Ira R. Steward
Wm H. Capel
INVENTOR
ELIHU THOMSON.
BY
Townsend & MacArthur
ATTORNEYS
THE NORRIS PETERS CO., PHOTO-LITHO., WASHINGTON, D. C.

(No Model.) 3 Sheets—Sheet 3.
E. THOMSON.
REGULATOR FOR DYNAMO ELECTRIC MACHINES.
No. 485,239. Patented Nov. 1, 1892.

WITNESSES:
Ira R. Steward.
Thos. W. Copel

INVENTOR
ELIHU THOMSON.
BY
Townsend MacArthur
ATTORNEYS

United States Patent Office.

ELIHU THOMSON, OF LYNN, MASSACHUSETTS, ASSIGNOR TO THE THOMSON-HOUSTON ELECTRIC COMPANY, OF CONNECTICUT.

REGULATOR FOR DYNAMO-ELECTRIC MACHINES.

SPECIFICATION forming part of Letters Patent No. 485,239, dated November 1, 1892.

Application filed April 6, 1888. Serial No. 269,873. (No model.)

*To all whom it may concern:*

Be it known that I, ELIHU THOMSON, a citizen of the United States, and a resident of Lynn, in the county of Essex and State of Massachusetts, have invented a certain new and useful Regulator for Dynamo-Electric Machines, of which the following is a specification.

My present invention relates to means for regulating the current of a dynamo-electric machine, so that such current shall be at all times adapted to the amount of work to be done.

The invention is especially applicable to current-regulators in which the brushes of the commutator of the machine are moved in any of the usual ways for compensating for increase or decrease of current on the circuit; but may likewise be applied to machines in which other regulating appliances are employed in place of an adjustable commutator for the purpose of controlling the output of the machine.

My invention is especially designed for application to those forms of dynamo-machine in which the field-magnet coils are placed in series with the armature and external work.

The invention consists in the combination, with the regulating appliances for regulating the current of the machine, of a controller or regulator magnet or other electro-responsive device, which is connected with a circuit independent of that which includes the two main brushes of the machine and which circuit carries a current developed by a magnetic field which is produced by the main current. The auxiliary regulating-circuit containing or connected to the controller or regulator magnet may be supplied with current either from auxiliary brushes taking current from the same armature-coils as those which supply the main circuit or may be supplied from an auxiliary armature moving in a field excited by the main circuit, or may be otherwise supplied with current, as will be hereinafter made apparent, which is developed by armature-coils moving in a field excited by the main current, so that the current of the auxiliary circuit will vary with the main current and may be employed through the intervention of the regulating or controlling magnet to actuate or control directly or indirectly the regulating appliances, such as the movable main brushes of the commutator for the machine.

Figure 7:
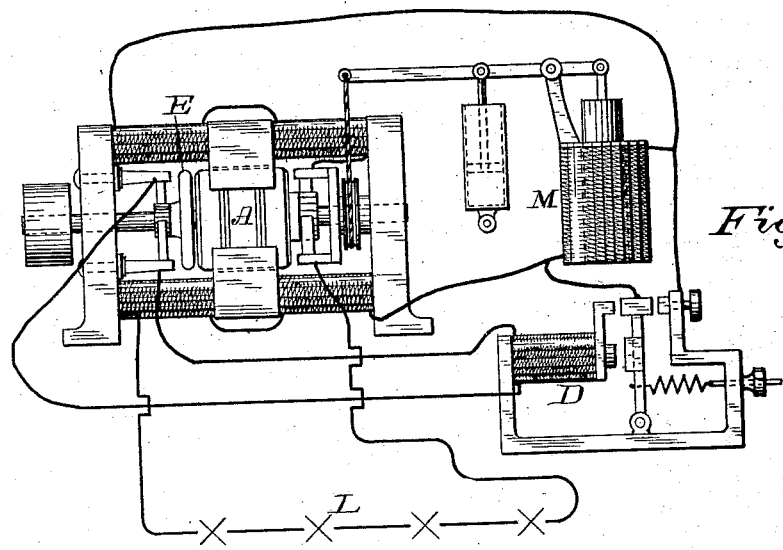
Figure 8:
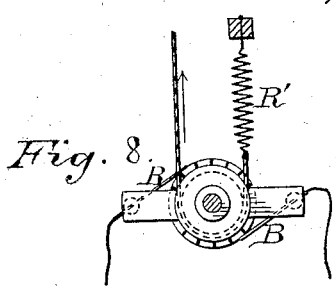
Figure 9:
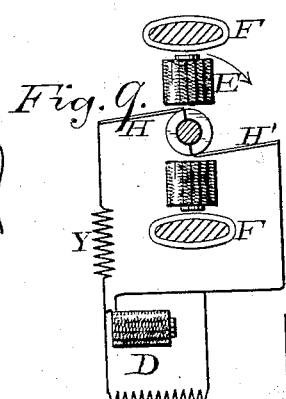
Figure 10:
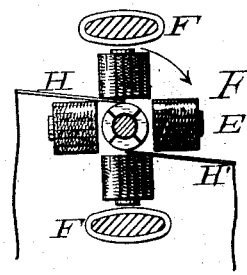
Figure 11:
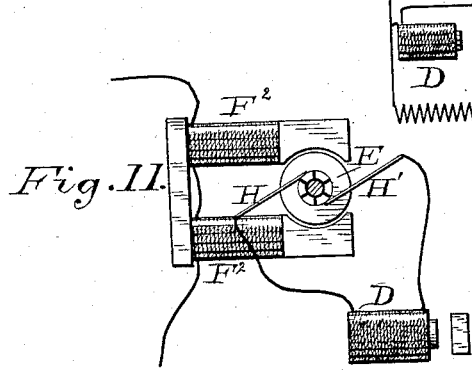
Figure 12:
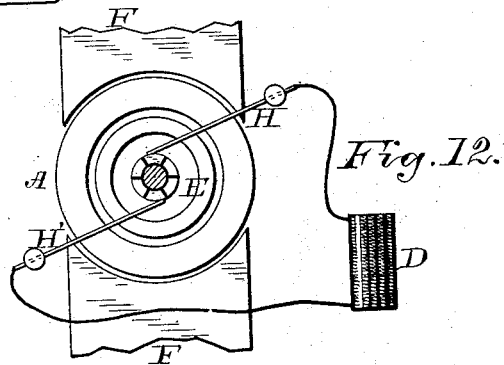

In the accompanying drawings, Figure 1 is a side elevation of an apparatus embodying my invention. Fig. 2 illustrates a modification in which the controller-magnet effects the desired movement of the regulating appliances through a motor-magnet instead of by the mechanical motor appliances of Fig. 1. Figs. 3 and 4 illustrate modifications in which the controller-magnet is supplied with current from auxiliary commutator-brushes independent of the main brushes. Fig. 5 shows an improved form of commutator for this modification of my invention. Fig. 6 illustrates in detail one of the auxiliary armature-coils for supplying current to the controller-magnet. Fig. 7 illustrates another modification of my invention. Figs. 8, 9, and 10 illustrate modified details of construction. Figs. 11 and 12 show other modifications in the manner of supplying the regulating-current to the controller or regulator magnet.

In Fig. 1 of the drawings I have illustrated my invention as applied to a machine in which the regulating appliance consists of a shiftable commutator. It is to be understood, however, that while I show one form of shiftable commutator for the main current I may employ other devices in which more complex movements are given either to the brushes or to the commutator-cylinder itself, or to both, provided always that the movement is such as to secure the desired compensation for any variation of the current. I have also shown in this and the other figures of the drawings a controller or regulator magnet which in response to variations of current or potential in the auxiliary regulating-circuit operates upon the regulating appliances or governs the action of mechanism operating thereupon, so as to effect the desired movements of such regulating appliance; but I do not limit myself to the employment of an electro-magnet as the device responsive to the auxiliary current, since many other electro-responsive devices exist and are known in the art, and any electro-responsive device will serve the purposes of my invention when properly organized and arranged to act in response to the variations of the current in the auxiliary or regulating circuit. It is also to be understood that when the electro-responsive device is employed to govern the action of another mechanism which shall impart the desired movement to the regulating appliance—such as a movable commutator—any intermediate motor mechanism may be employed, provided its action is properly governed by the regulator or controlling magnet after the manner hereinafter described, so as to shift the brushes backward or forward, as required.

In the drawings, F F indicate the field-magnet coils of an ordinary series dynamo-electric machine, said coils being included in the main electric circuit taken from the commutator of the machine through the brushes B B of said commutator.

L L indicate the arc lights or other translating devices arranged in series of multiple series, as desired.

The armature of the machine may be of any desired type; but I prefer to employ the form heretofore devised by me and shown in various patents as consisting of three armature-coils having a common joint for one set of ends and connected severally at their other set of ends to the segments of the commutator.

The regulating appliance for the machine is comprised in this instance of the brushes B B, mounted on a suitable rocking support and movable circumferentially around the commutator-cylinder by any suitable appliance. In the present instance I have shown the support for the brushes as connected with an operating-bar G, which is propelled in one or the other direction by means of friction rolls or gears R R', driven constantly by any suitable motive power in the direction of the arrows. The rod or bar G may be moved into contact with one or the other of the rollers, as desired, and such movement, for the purpose of securing the desired adjustment of the commutator, is effected by the regulator or controller magnet D, which has the movable core C, connected with a pair of loose rolls V V', between which the end of the bar G is loosely supported. A spring S assists the lifting of the core by aiding in supporting the weight of the bar G and connecting devices. When the magnet D increases in strength, bar G is moved into contact connection with the roll R, while on a release of the core the bar falls into connection with the roll R'. The rolls R R' should have sufficient friction to move the rod G backward or forward when these actions occur. The electro-magnet D C may be replaced by any other form of electro-magnet. The current for said magnet is supplied by auxiliary coils E, disposed on any part or parts of the armature A, in addition to the ordinary winding supplying the translating devices L.

The coils E are connected with a suitable commutator H, from which the current developed in said coils is taken to the electro-magnet D. The resistance of the circuit including the coils E is made such that the coil shall receive a normal energy insufficient to heat it. This may be adjusted at the start in many well-known ways.

In Fig. 1 a controller or regulator magnet D effects the adjustment of the regulating appliances through the intervention of a motor mechanism consisting of bar G and rolls R R'; but, as indicated in Fig. 2, the controller-magnet D may effect the adjustment through the intervention of a motor-magnet M, which is thrown into and out of action by means of the contacts K, governed by magnet D in obvious manner.

With the arrangement thus far described if the main current increases through the cutting out of lights or other translating devices L L or from any other cause, the field-magnets of the machine become magnetized more strongly by their coils F F and the current in the auxiliary circuit supplied by the coil E is strengthened, so as to pull up the core C and cause forward motion of the bar G and brushes B B to diminish the current. On a decrease of the current on the main circuit the reverse action takes place. The contacts K, Fig. 2, are shunted with the usual artificial resistance $R^2$.

In Fig. 2 the regulating-circuit is taken from the ordinary armature-winding and commutator by accessory brushes H H', set a space apart on the commutator, as shown. The current taken up by them, depending on the main current and main-field strength, acts on a controller-magnet D, which opens a shunt at K around a motor-magnet M in any suitable circuit, and this latter gives movement to the brushes to correct variations in the main-circuit current, which when too great affect the field-magnets of the machine too strongly, and raises the potential between brushes H and H', and vice versa.

In Fig. 3 the accessory or auxiliary circuit brushes H H' are carried by the same yoke which carries the main brushes B B. It is, however, essential that when such an arrangement be employed the field-magnetism of the machine shall be uniformly distributed around the armature, or, more precisely, that the potential difference of the points of the commutator at which brushes H and H' rest at any time shall be the same when a normal or standard current flows in the field-circuit. This is not the case when the field-magnetism has an irregular or uneven distribution around the armature. The parts D and M in in Fig. 3 are controller-contact magnet and motor-brush-shifting magnet, respectively. J is a dash-pot. F represents field-coils of the machine; L L, lights or other devices in circuit. The actions, with the limitations specified, are the same as those of the preceding figures.

In the diagram Fig. 4 the brushes H H' are shown with arrows giving the direction of the current which flows in them to magnet-coil D when the main-circuit current flows, as indicated. The brushes H H' are always to be used as a sort of branch or auxiliary circuit collector, and they must of course touch segments between which are included active coils or coils on the armature, which traverse or move in the field of the machine.

To avoid short-circuiting the segments of the commutator when the coils are very active and the brushes H H' are applied, which might occur when a brush touched two adjacent segments simultaneously, the commutator may be arranged, as in Fig. 5, with wider insulating-spaces between segments only where the brushes H H' bear, so that the tip of each brush rides on insulating material in passing from one segment to the next.

Fig. 6 shows an armature-coil E separate and the brushes H H' connecting with segments to which the coil ends are carried, the coil E also moving in front of the field-magnet F. If any variation of current strength occurs, it is manifest that the field will change and the current through H, H', and D will vary, also, and may, as in Figs. 1, 2, and 3, be made by suitable connections to correct the variation of main current which caused the original variation of field strength.

The arrangement shown in Fig. 7 differs from Fig. 1 only in the fact that a separate armature E furnishes the auxiliary current, while armature A furnishes the main or working current. The brushes of the main armature-commutator are movable to positions of constant current under varied number of lamps at L, and the brushes of the commutator of armature E are fixed, preferably. The armature E is placed and revolved so as to be affected by the field magnetism of the machine. For this purpose it suffices to drive it by the power near to the field-magnets, either on a separate shaft or, as shown, on the machine-shaft itself, which of course is simpler. The other parts D M, &c., are the same, substantially, as are seen in the foregoing figures.

Fig. 8 indicates one way of conveying the movement from the motor-magnet to the main brushes by a cord passing around a pulley on the brush yoke or carrier and a counteracting-spring R' on one end of the cord from a fixed support above, the other end of the cord being pulled, as in direction of arrow, by the motor-magnet M, Fig. 7.

The armature E of Fig. 7 may be of any suitable type, such as a small Gramme ring, with a suitable commutator; or, as in Fig. 9, it may be simply a bar carrying bobbins, with a half-circle segment-commutator to which brushes H H' are applied in suitable position to take up current developed during revolution and convey it to the controller-magnet D. The position of the commutator and brushes may be selected to give the normal energy to the magnet D when a normal current circulates in the coils of the field-magnets F F, between which the armature E revolves, or a resistance Y, whose amount may be adjusted or varied, can be inserted into the circuit when the current might otherwise be too great in magnet D, or the magnet D may be shunted by a greater or less resistance for the same purpose.

The auxiliary-current source in Fig. 10 is a four-coil cross with a four-segment commutator, the connections being those well known in such a structure, opposite coils connected in series and opposite segments connected to terminals of opposite coils.

It is not essential that the armature E or auxiliary-circuit source be revolved in the field of the machine itself, as in Figs. 7, 9, and 10; but, as in Fig. 11, a separate small field $F^2 F^2$, whose coils are connected into the main or lighting circuit, may sometimes be used with advantage for the generation of current in auxiliary armature E, which is suitably revolved between the poles of the field $F^2 F^2$. Thus in Fig. 11 we have a small auxiliary dynamo with its field magnetized in the main or working circuit and the armature of which furnishes current which moves the main brushes or shifts the main commutator, as in Figs. 1, 2, or 3, to positions of constant current. In this case the main field need not be a series field.

In Fig. 12 the auxiliary armature E is shown as placed within the main armature-ring, and this may be the case when the strength of the main field is so great that an internal field exists in the interior of the main armature, to the variations of which the auxilary current taken from armature E will respond in electro-motive force and consequent strength. This current is to be utilized, as before, for regulating the current of the main armature.

What I claim as my invention is—

1. In a regulator for constant current, means for taking current from a section only of the armature-winding irrespectively of the main-current connections, a device responding to the current so taken up, and electro-magnetic mechanism controlled thereby for shifting the brushes of the machine connected to the main circuit to positions on the commutator at which constant currents are taken up.

2. In a direct-current dynamo-electric machine in which the main current is passed through the field-magnet coils for excitation, a shifting commutator therefor with mechanism for shifting the commutator to positions at which the brushes take up a constant or standard current, in combination with mechanism responsive to the variations of current in a circuit independent of the main circuit of the machine, said mechanism controlling the shifting commutator, so that the current flowing in the circuit as fed from the brushes of the commutator shall be substantially constant.

3. The combination, in a dynamo-electric machine, of an accessory armature-circuit taken from a portion only of the armature-winding, devices responding to variations of current taken from said section, and mechanism controlled by said responsive device to shift the brushes on the commutator to positions at which the current taken up and carried to the main circuit shall be constant.

4. In a dynamo-electric machine, in addition to the ordinary armature-winding and commutator, a separate coil or section of wire wound on the armature, with means for collecting current therefrom independent of the main circuit, a device responding to the current in said separate section, and mechanism controlled thereby for shifting the brushes on the main commutator or collector, so that the current taken up therefrom shall be constant.

Signed at Lynn, in the county of Essex and State of Massachusetts, this 29th day of March, A. D. 1888.

ELIHU THOMSON.

Witnesses:
J. W. GIBBONEY,
E. S. BREED.